UNITED STATES PATENT OFFICE.

HENRY TORSTRICK, OF HOBOKEN, NEW JERSEY.

IMPROVEMENT IN WORKING OVER VULCANIZED INDIA-RUBBER.

Specification forming part of Letters Patent No. 15,998, dated October 28, 1856.

*To all whom it may concern:*

Be it known that I, HENRY TORSTRICK, of Hoboken, in the county of Hudson, in the State of New Jersey, have invented a new and Improved mode of extracting all inorganic matter from india-rubber, gutta-percha, and similar gums, manufactured and vulcanized after Goodyear's and others patent; and I do hereby declare that the following is a full and exact description thereof.

The nature of my invention consists in the manner of extracting sulphur and other inorganic matter contained in sulphur, treated or vulcanized india-rubber, gutta-percha, and other gums or their compounds, so that said gums will be restored again to a condition or state whereby they may be again used either as a substitute for the original or raw material or in combination with the same. For this purpose I cut up or grind the gum to be treated into small pieces or to powder by the application of any known machinery, and then treat the same with nitric acid, which oxidizes the sulphur contained therein into sulphuric acid, and changes all other matter—such as lime, chalk, white lead, zinc-white, &c.—into nitrates, all of which are then extracted by frequent washing. I use either single or double aqua fortis, diluting the same with from one (1) to two (2) parts of water, if the former is used, and with about four (4) parts if I use the latter, according as there are more or less impurities in the gum. The quantity depends likewise upon the quantity of impurities contained in the same, and at the same time upon the quantity under treatment at one time, and may be stated, if one pound is under treatment, to require about half a pint of diluted acid to one pound of gum, and that acid which is not converted into nitrates in combination with the inorganic matter may be used again. After having been cleaned through the above-described treatment the gum is subjected either to the vapors of fusel-oil, (grain-oil, or a certain quantity of said oil.) After said oil has been treated with sulphuric acid, in a heated state, it is well mixed up with the gum for the purpose of restoring it to a compact and elastic mass. This fusel or grain oil is the refuse largely obtained by the process of distilling pure spirits from grain, &c., and the usefulness of which has not been either much known or applied as yet. The quantity of fusel-oil necessary depends upon the quantity of gum under treatment at one time, and likewise upon the arrangement used for mixing the same with the gum. If only one pound of gum is treated, then about one-quarter of a pound of fusel-oil will be required. The mass, which will be after this last treatment sticky or tacky, is then, by the addition of a small quantity of chloride of calcium, sulphurate of lime, or any other similar substance, reduced to a state of cohesion similar to its natural state, after which it is dried, and is fit for use either alone or in combination with the native gum. The process above described distinguishes itself from all other before-known processes by extracting all impurities which may be contained in the gums by one treatment.

What I claim as my invention, and desire to secure by Letters Patent, is—

The manner of extracting inorganic matter from vulcanized india-rubber, gutta-percha, and other gums or their compounds by the application of diluted nitric acid and the use of fusel-oil, (grain-oil,) either in a heated state mixed with the gum or in the shape of vapors, for the restoration of the cleansed gums to the state of cohesion.

HENRY TORSTRICK.

Witnesses:
HENRY E. ROEDER,
JOHN A. STEMMLER.